United States Patent [19]

Desjardins

[11] Patent Number: 4,849,101

[45] Date of Patent: Jul. 18, 1989

[54] AERATION DEVICE WITH A PROTECTION SKIRT

[76] Inventor: Gaétan Desjardins, 8070 Yves Prévost, Ville d'Anjou, (Quebec), Canada, H1J 1H5

[21] Appl. No.: 225,173

[22] Filed: Jul. 28, 1988

[30] Foreign Application Priority Data

Feb. 3, 1988 [GB] United Kingdom ............... 8802430

[51] Int. Cl.⁴ ............................ C02F 3/20; B01F 3/04
[52] U.S. Cl. .................................. 210/170; 210/220; 261/77; 261/121.1; 261/DIG. 70
[58] Field of Search ............... 210/170, 220, 197, 628, 210/219, 758, 221.1, 221.2; 261/77, 84, 121.1, 126, DIG. 70, DIG. 71

[56] References Cited

U.S. PATENT DOCUMENTS

| | | | |
|---|---|---|---|
| 4,169,873 | 10/1979 | Lipert | 261/77 X |
| 4,215,081 | 7/1980 | Brooks | 261/77 X |
| 4,216,091 | 8/1980 | Mineau | 210/220 X |
| 4,235,720 | 11/1980 | Nakajima et al. | 210/220 |
| 4,242,199 | 12/1980 | Kelly | 210/220 X |
| 4,336,144 | 6/1982 | Franklin, Jr. | 210/220 X |
| 4,439,316 | 3/1984 | Kozima et al. | 261/77 X |
| 4,569,757 | 2/1986 | Moore | 210/220 |

*Primary Examiner*—Tom Wyse
*Attorney, Agent, or Firm*—Bacon & Thomas

[57] ABSTRACT

An aeration device is immersed in an aeration-sedimentation basin for oxygenating the water contained therein. The aeration device comprises a vertical, hollow aeration column with a lower inlet and an upper outlet. A pipe supplied with pressurized air has an orifice to produce in the column an upward jet of air. A skirt surrounds the lower portion of the column including the inlet, which skirt has a closed, lower end but an open, upper end above the level of the solid accumulations in the basin. Water substantially free from solid accumulations is therefore pumped by the air jet through the open, upper end of the skirt and the water inlet, the pumped water flowing through the column from the inlet to the outlet while being oxygenated by the air jet, and the so oxygenated water being returned in the basin through the outlet.

9 Claims, 3 Drawing Sheets

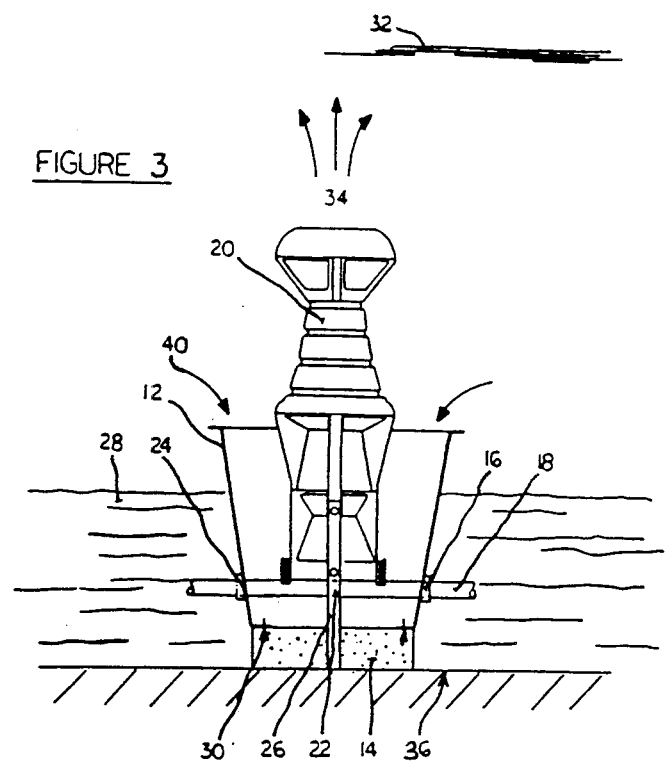
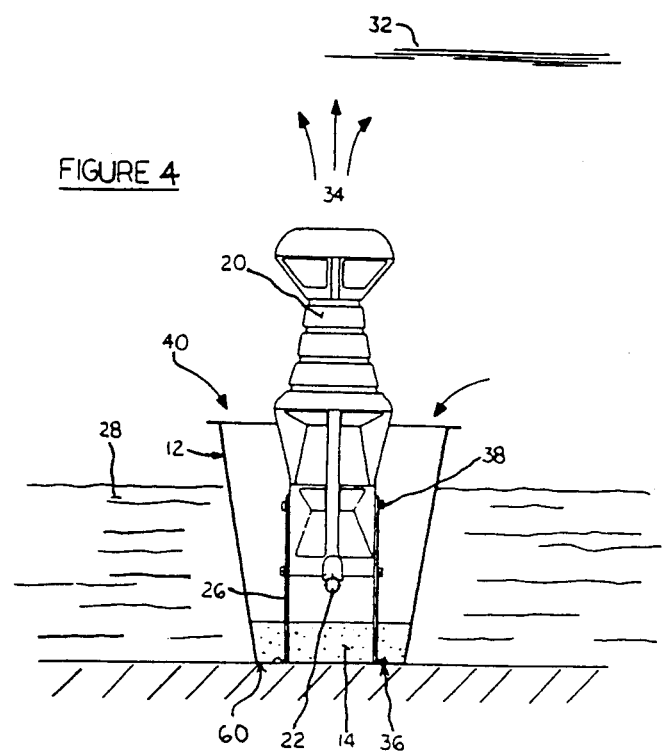

AERATION DEVICE WITH A PROTECTION SKIRT

BACKGROUND OF THE INVENTION

The present invention is related to an improved aeration device, more specifically to an accessory-equipment to be used in protecting all kinds of aeration devices designed for oxygenating the water in aeration-sedimentation basins, such as biological aeration basins, digestion basins or particularly aerated facultative lagoons. In order to simplify the wording of the following description, only the word "basins" will be used hereinafter to identify both the basins and lagoons.

In fact, the present invention can be readily applied to all aeration devices called "static aerators" used for oxygenating the water in a basin of the above type. In such a basin, industrial or municipal sewage and waste water are treated by subjecting them to an aerobic digestion. To achieve this aerobic digestion, oxygen is injected in the water of the basin. Although it can be used in all applications, the invention is particularly suitable for use in aerated facultative basins where large solid accumulations are permitted for long time periods.

The presence of solid accumulations constitutes a real threat to any air diffusing system using static aerators as it will eventually cause a serious clogging problem;
decrease aeration performance.

These inconveniences are presently being somewhat overcome by costly operation and maintenance means. Even with these means, no intermittent operation of the aerators is recommendable as clogging possibilities will increase in proportion with the "stop-start" operation and with the importance of the solid accumulations at the bottom of the basin. Also, circulation of anaerobic solids through the aerator represents a waste of energy as considerable oxygenation capacity of the installed equipment is being used to oxygenate solids that in a facultative process (water being treated aerobically and solids anaerobically) are meant to be treated anaerobically at the bottom of the basin.

The evolution of the clogging problem will depend upon the rate of accumulation of solids (sludge), and will also depend on the number of times and the frequency at which the aerator operation will be interrupted for any given reason (maintenance, power failure, noise inconvenience, energy conservation, etc . . . ).

Conventionally, a static aerator is immersed and formed with an aeration column provided with a lower inlet and with an upper outlet. Air under pressure is supplied through an air line provided with an orifice to produce in the column an upward jet of air. The air jet causes flowing of water through the column from its inlet to its outlet while oxygenating the water.

Each time the supply of pressurized air to a static aerator is interrupted, some water enters the air line through the calibrated air outlet orifice which is drilled on this pressurized air feeding line. Since this orifice is always located close to the bottom of the basin where sludge accumulates, water entering in the air line will carry an important quantity of solids.

When the supply of pressurized air is restored, most of the solids are exhausted with the water through the orifice. However, a small quantity of solids remains inside the air line and sticks to the internal wall of the pipe. Shortly after, warm air dries off and cooks these deposits on the wall surface.

After a certain number of repetitions, a large amount of solid deposits are formed within the air line. These deposits will eventually detach from the internal surface of the air pipe and be blown out through the orifice. The larger deposits will, along with any relatively large solids, clog the orifices partially or completely. Some of these solids will build up and become very hard if a certain chemical reaction occurs.

Other types of blockage are also observed with larger solids (organic and inorganic) and with fibrous/hairy material that can attach easily to every sharp edge. These types of material are normally found in all municipal sewage and have a tendency to cause clogging right at the lower water inlet of the aeration column and/or at the air exhaust orifice that is drilled on the air supply pipe inside each aerator.

OBJECT OF THE INVENTION

The main object of the present invention is to eliminate the above discussed drawbacks by providing the lower part of an aeration device with a skirt surrounding the aeration column and the water inlet, which skirt is closed at the lower end thereof but open at the upper end.

SUMMARY OF THE INVENTION

More specifically, in accordance with the present invention, there is provided an aeration device immersed in water for oxygenating said water contained in an aeration-sedimentation basin with solid accumulations at the bottom thereof, comprising (a) a vertical, hollow aeration column provided with a lower water inlet and with an upper water outlet, and (b) nozzle means supplied with pressurized air to produce within the hollow column an upward jet of air, the improvement therein comprising a skirt surrounding the lower portion of the aeration column including its water inlet, which skirt having a closed, lower end but an open, upper end above the level of solid accumulations.

In operation, water substantially free from solid accumulations is pumped by the air jet through the open, upper end of the skirt and the water inlet of the aeration column. The pumped water flows through the aeration column from its inlet to its outlet while being oxygenated by the jet of air, and the so oxygenated water is returned in the basin through the water outlet.

As can be appreciated, the skirt causes settlement of the solid accumulations once for all at the bottom of the basin away from the aeration device.

Accordingly, by means of the skirt, a facultative process (water being treated aerobically and solids being treated anaerobically at the bottom of the basin) is better defined, e.g. the solid accumulations will be encouraged to settle at the bottom and to stay settled where they belong. To that effect, the skirt modifies the hydraulic influence of each aeration device when pumping and recirculating water through its column under the air-lift principle of operation. Oxygen transfer from the air to the water occurs during this contact process.

As the aeration device operates in cleaner water, intermittent supply of the pressurized air is enabled to reduce operating energy cost without major maintenance clogging problems. The energy cost is also reduced as oxygen transfer is not waste to oxygenate solids that are meant to be treated anaerobically at the bottom of the basin.

The energy cost is further reduced by providing a better global oxygenation efficiency factor due to the fact that the aeration device operates in cleaner water. Indeed, it is well recognized that it is easier to transfer oxygen in cleaner water. As a matter of fact, the more solids in the water, the less efficient the oxygen transfer will be.

Operation of the aeration device in cleaner water considerably reduces clogging problems of any kind to considerably reduce all maintenance works.

In accordance with a preferred embodiment of the present invention, the skirt is formed in a studied frusto-conical shape with the larger base being at the top. The so formed skirt will accelerate water velocity toward the bottom of the reservoir defined by the skirt to keep it clean without solid sediments. With the skirt of frusto-conical shape, lateral suction water currents from where settled solids are normally drawn toward the aeration device are blocked. On the other hand, such a skirt causes high water circulation being from the superior level of the skirt where much cleaner water is. A frusto-conical skirt with the larger, top base open enables a large water circulation drawn vertically but also laterally at the superior level formed by the upper skirt edge. The intention is to discourage at that point direct recirculation of oxygenated water escaping from the aeration device back toward the suction of the device.

Advantageously, the bottom of the skirt is designed as a formand/or reservoir to pour concrete therein in order to obtain a concrete pad directly instead of using separate forming, thereby reducing installation costs. Also, no anchorage is then required to fix the skirt to the concrete pad.

The objects, advantages and other features of the present invention will become more apparent upon reading of the following non-restrictive description of preferred embodiments thereof, made with reference to the accompanying drawings.

BRIEF DESCRIPTION OF THE DRAWINGS

FIGS. 1, 2 and 3 are respectively front elevational, plan and side elevational views of a static aerator provided with a skirt according to the invention mounted on a concrete pad;

FIG. 4 is a front, elevational view of a static aerator provided with a skirt according to the invention, the bottom of the skirt being designed as a form for direct pouring of the concrete of the pad;

DETAILED DESCRIPTION OF THE PREFERRED EMBODIMENTS

Figure 1:
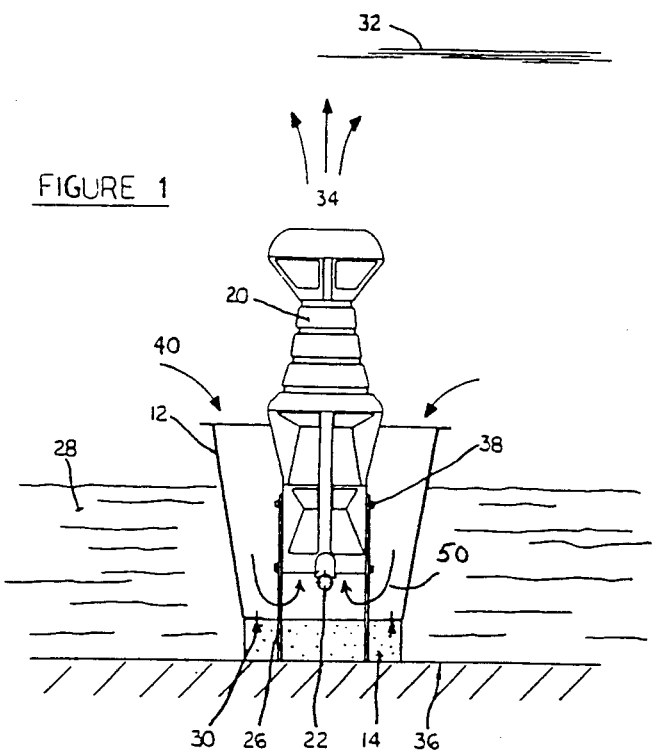
Figure 2:
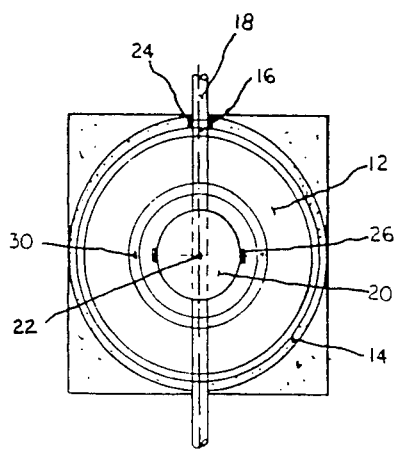

As illustrated in FIGS. 1 to 3 of the drawings, there is illustrated a static aerator 20 formed of a hollow column so formed as to provide for efficient transfer of oxygen in the water. As can be seen, the aerator is open at the lower end and the upper end thereof to form a lower water inlet and an upper water outlet. The hollow column of the aerator 20 is supported by means of two bars such as 26 diametrically opposed with respect to each other and attached to the column through suitable fasteners such as 38. The lower end of the vertical bars 26 is embedded into a concrete pad 14.

Conventionally, a pipe 18 supplied with pressurized air by a blower is fixed to the hollow column thereunder. In the vertical axis of the column a nozzle orifice 22 is bored whereby an upward jet of air is produced within the column to pump water which flows upwardly in the column from the lower inlet to the upper outlet, while oxygenating the so flowing water.

The above described aerator is of conventional design and for that reason, it will not be further elaborated.

In accordance with the present invention, a skirt 12 surrounds the lower portion of the column of the aerator coaxially therewith. The skirt 12 is frusto-conical with the larger base thereof at the top. As can be seen, the upper end of the skirt is open while the lower end thereof comprises an annular flange attached to the concrete pad 14 by means of fasteners such as 30 diagrammatically shown in the attached drawings. The lower end of the skirt 12 is thereby closed.

In FIGS. 1 and 3, the reference 32 illustrates the level of the liquid in the basin, and the reference 36 illustrates the bottom of this basin. As can also be appreciated from these two Figures, the upper edge of the skirt 12 is above the level of the solid accumulations 28 at the bottom of the basin.

In operation, the jet of air from the nozzle orifice 22 pumps water through the open, upper end of the skirt 12 and through the lower inlet of the aeration column, as indicated by the arrows 40 and 50. The pumped water flows upwardly in the column while being oxygenated by the air jet. The so oxygenated water is returned in the basin through the upper outlet of the column, as indicated by the arrows 34.

It should be noted here that the skirt 12 is sealed around the mounting, concrete pad 14 which can be round or square as shown in FIG. 2. Seals such as 16 are also mounted between the air pipe 18 and the skirt 12.

As can be appreciated, only water substantially free from solid accumulations is pumped and flows through the column of the aerator 20, which results into the above discussed advantages.

The arrows 40 also shows that the water is aspirated both vertically and laterally above the level of the solid accumulations 28, thanks to the frusto-conical shape of the skirt 12.

Thus, the static aerator 20 can operate in cleaner water substantially free from solids. Only this cleaner water will enter in the air pipe 18 so that substantially all the clogging problems in this pipe are eliminated.

In FIG. 4, the bottom 60 of the skirt 12 is closed to be used as a form in which the concrete forming the pad 14 is directly poured, with the two bars 26 introduced within the concrete for an embedment and attachment thereof in the concrete.

Figure 5:
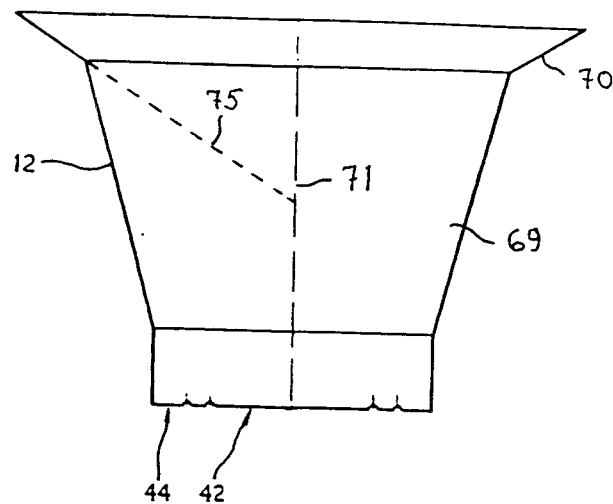
FIGS. 5 and 6 are respectively elevational and plan views of an embodiment of the skirt according to the invention.
Figure 6:
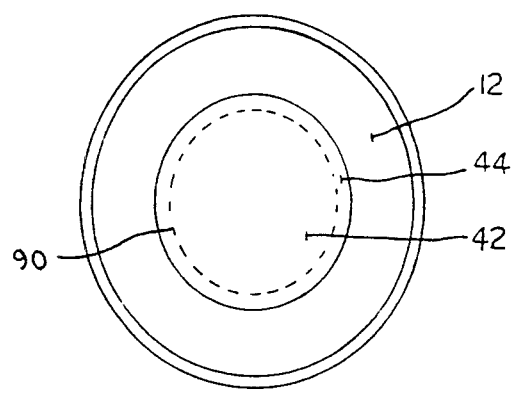

FIGS. 5 and 6 illustrate an advantageous embodiment for the skirt 12, which skirt comprises a lower cylindrical portion with a closed planar bottom formed by an annular pheripheral portion 44 and a central portion 42 connected together through a score line 90. The central portion 42 can be cut along the line 90 and removed, whereby the peripheral portion 44 forms a flange 44 by means of which the skirt 12 can be attached to the concrete pad 14 by means of fasteners such as 30 shown in FIGS. 1 and 3. Removal of the portion 42 allows, in particular, installation of the skirt 12 on the concrete pad of aerators already in operation; indeed, the open, lower end of the skirt 12 can then be passed around the aeration column and the bars 26 to be positioned as required on the concrete pad. If the central portion 42 is not removed, concrete can be poured directly in the lower cylindrical portion to form the pad 14.

The skirt 12 of FIGS. 5 and 6 further comprises a middle frusto-conical portion 69 and an upper, also frusto-conical portion 70. Both the portions 69 and 70 have their larger diameter at the top of the corresponding frusto-conical portion. As can be seen, the portions 69 and 70 are coaxial with respect to the vertical axis 71. The angle between the common axis 71 and the generator of the cone (such as 75 for the frusto-conical portion 70) being wider for the portion 70 than for the portion 69. The embodiment of FIGS. 5 and 6 encourages pumping of water both vertically and laterally as shown by the arrows 40 in FIGS. 1 and 3.

Although the present invention has been described hereinabove by means of preferred embodiments thereof, it should be pointed out that any modification to these embodiments, within the scope of the appended claims, is not deemed to change or alter the nature and scope of the present invention.

What is claimed is:

1. An immersible aeration device for oxygenating water contained in an aeration-sedimentation basin with solid accumulations at the bottom thereof of the type including a vertical, hollow aeration column provided with a lower water inlet and with an upper water outlet, and nozzle means for receiving pressurized air to produce an upward jet of air within the hollow column, the improvement comprising a vertical, non-perforated skirt surrounding the lower portion of said aeration column including its water inlet, the skirt having a closed lower end and an open upper end for disposition above the level of solid accumulations, whereby, in operation, only water substantially free from solid accumulations is pumped by the air jet through the open upper end of the skirt and the water inlet of the aeration column, the pumped water flowing through the aeration column from said water inlet to said water outlet while being oxygenated by the jet of air, and the so oxygenated water being returned into the basin through said water outlet.

2. An aeration device according to claim 1, in which said skirt is frusto-conical with the larger diameter at the upper end thereof.

3. An aeration device according to claim 2, wherein said skirt is coaxial with said hollow column.

4. An aeration device according to claim 1, wherein the lower end of said skirt is closed by a concrete pad, to which is attached both the lower end of the skirt and the aeration column, said concrete pad being disposed on the bottom of said basin.

5. An aeration device according to claim 4, wherein the lower end of sad skirt comprises an annular flange attached to the concrete pad by means of suitable fasteners.

6. An aeration device according to claim 4, wherein the lower end of the skirt includes a form means for receiving concrete to form said concrete pad.

7. An aeration device according to claim 4, in which the aeration column is supported by means of two vertical bars having respective upper ends attached to said column and respective lower ends embedded within the concrete of the concrete pad for securing the aeration column to said pad.

8. The aeration device of claim 1, wherein said skirt includes a lower cylindrical skirt portion and an upper frusto-conical skirt portion, with the larger diameter disposed at the upper end thereof, and the lower and upper skirt portions being coaxial.

9. The aeration device of claim 1, wherein said skirt includes lower and upper, coaxial frusto-conical skirt portions, each frusto-conical skirt portion having its larger diameter at the top thereof, and said lower and upper frusto-conical portions defining first and second angles, respectively, from the vertical axis of the skirt, the second angle being greater than the first angle.

* * * * *